United States Patent
Hoffman (10) Patent No.: US 10,283,032 B2
(45) Date of Patent: May 7, 2019

(54) INTEGRATED CIRCUIT FOR NONLINEAR DATA ENCODING

(71) Applicant: SAMSUNG DISPLAY CO., LTD., Yongin, Gyeonggi-Do (KR)

(72) Inventor: David M. Hoffman, Fremont, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 239 days.

(21) Appl. No.: 15/147,812

(22) Filed: May 5, 2016

(65) Prior Publication Data

US 2017/0103691 A1    Apr. 13, 2017

Related U.S. Application Data

(60) Provisional application No. 62/238,408, filed on Oct. 7, 2015.

(51) Int. Cl.

| | |
|---|---|
| *G09G 3/20* | (2006.01) |
| *G06F 3/14* | (2006.01) |
| *G06T 1/60* | (2006.01) |
| *H04N 19/42* | (2014.01) |
| *H04N 19/126* | (2014.01) |

(52) U.S. Cl.
CPC ............ *G09G 3/2003* (2013.01); *G06F 3/14* (2013.01); *G06T 1/60* (2013.01); *G09G 3/2007* (2013.01); *H04N 19/42* (2014.11); *G09G 2320/0242* (2013.01); *G09G 2320/0271* (2013.01); *G09G 2320/0276* (2013.01); *G09G 2320/0666* (2013.01); *G09G 2360/16* (2013.01); *H04N 19/126* (2014.11)

(58) Field of Classification Search
None
See application file for complete search history.

(56) References Cited

U.S. PATENT DOCUMENTS

| | | | | |
|---|---|---|---|---|
| 5,227,863 | A * | 7/1993 | Bilbrey | H04N 5/262 |
| | | | | 348/578 |
| 5,319,395 | A | 6/1994 | Larky et al. | |
| 5,506,797 | A * | 4/1996 | Koshiba | G06F 1/0307 |
| | | | | 708/204 |
| 5,729,723 | A * | 3/1998 | Wada | G06F 9/30101 |
| | | | | 711/212 |
| 6,166,781 | A * | 12/2000 | Kwak | H04N 1/401 |
| | | | | 348/254 |

(Continued)

FOREIGN PATENT DOCUMENTS

| | | | | |
|---|---|---|---|---|
| EP | | 3051823 A1 * | 8/2016 | ............ H04N 19/70 |
| WO | WO 2014/128586 A1 | | 8/2014 | |

*Primary Examiner* — Kee M Tung
*Assistant Examiner* — Patrick F Valdez
(74) *Attorney, Agent, or Firm* — Lewis Roca Rothgerber Christie LLP (57) ABSTRACT

A method of image processing, the method including performing linear processing of an input data signal encoded with a nonlinear function to generate a linear representation of the input data signal including linearized image data, and using an integrated circuit to generate a processed linear image by nonlinearly quantizing the linearized image data to generate nonlinear quantized data, generating a memory address based on the nonlinear quantized data, and accessing a lookup table based on the generated memory address.

17 Claims, 5 Drawing Sheets

(56) References Cited

U.S. PATENT DOCUMENTS

| | | | | |
|---|---|---|---|---|
| 6,559,856 B1* | 5/2003 | Fossum | ............. | H03M 7/24 |
| | | | | 345/426 |
| 6,677,945 B2 | 1/2004 | Lapidous et al. | | |
| 6,900,747 B2* | 5/2005 | Lee | ............. | H03M 7/30 |
| | | | | 341/106 |
| 7,336,831 B2* | 2/2008 | Yeh | ............. | H03M 7/30 |
| | | | | 382/232 |
| 8,774,269 B2 | 7/2014 | Marpe et al. | | |
| 8,934,542 B2 | 1/2015 | Wiegand et al. | | |
| 8,978,149 B2 | 3/2015 | Barraclough et al. | | |
| 9,077,994 B2 | 7/2015 | Miller et al. | | |
| 2005/0285871 A1* | 12/2005 | Tsujiguchi | ............. | G06F 9/383 |
| | | | | 345/565 |
| 2011/0013205 A1* | 1/2011 | Hansaki | ............. | H04N 1/52 |
| | | | | 358/1.8 |
| 2014/0028479 A1* | 1/2014 | Cheung | ............. | H03M 7/02 |
| | | | | 341/87 |
| 2014/0247869 A1 | 9/2014 | Su et al. | | |
| 2014/0316752 A1* | 10/2014 | Azadet | ............. | G06F 17/5009 |
| | | | | 703/2 |
| 2015/0302562 A1* | 10/2015 | Zhai | ............. | H04N 19/46 |
| | | | | 382/233 |
| 2016/0150145 A1* | 5/2016 | Van Der Vleuten | ............. | |
| | | | | H04N 5/2355 |
| | | | | 348/234 |

* cited by examiner

INTEGRATED CIRCUIT FOR NONLINEAR DATA ENCODING

CROSS-REFERENCE TO RELATED APPLICATIONS

This application claims priority to, and the benefit of, U.S. Provisional Patent Application No. 62/238,408, titled "INTEGRATED CIRCUIT FOR NONLINEAR DATA ENCODING," filed in the United States Patent and Trademark Office on Oct. 7, 2015, the entire disclosure of which is incorporated herein by reference.

BACKGROUND

1. Field

Embodiments of the present invention relate to display devices.

2. Related Art

A variety of display devices have been developed. Examples thereof include liquid crystal display devices, field emission display devices, plasma display devices, and organic light emitting display devices. These displays are lighter in weight and smaller in volume than conventional cathode ray tube displays.

For historic and perceptual reasons, input image data/data of a digital video signal, which corresponds to images to be displayed on a display panel of a display device, is often encoded with a highly nonlinear function, which may be referred to as an Electro-Optical Transfer Function (EOTF). The EOTF effectively describes how to turn a digital code word corresponding to input image data into visible information to be perceived by a user. Some EOTFs include gamma nonlinearity, which was commonly used for cathode ray tube (CRT) display devices, Perceptual Quantizer (PQ) (e.g., SMPTE S-2084), DICOM (Digital Imaging and Communications), etc. A shape of an effective EOTF will correspond to qualities of the visual perception of the images by the user. Furthermore, by the conclusion of all data processing, the EOTF of the encoded data should be consistent with the EOTF of the display device such the images are presented correctly.

There may be a number of reasons why display devices employ nonlinear encoding strategies. One reason is that it is desirable to assign the input image data to perceptually relevant gray scale levels. Such nonlinearity may be understood when it is realized that the user perception of display characteristics may also be nonlinear. For example, the user may be able to perceive small changes in brightness, or small changes in light intensity (e.g., one nit, or one candela per meter squared, of difference) at a dark end of the spectrum of gray scale levels, while the user may not be able to perceive differences in brightness that are less than a change of about 10 nits at the bright end of the spectrum of gray scale levels (e.g., at an end of the spectrum corresponding to about 100 nits or more). That is, differences between adjacent gray scale levels are more easily observed at lower gray scale levels at a lower end of the spectrum.

For example, in an EOTF of a conventional display device, differences between adjacent digital values at the low/left end of a graph representing the EOTF may correspond to a fairly small change in brightness, while differences between adjacent digital values at the far right end of the graph correspond a fairly large change in brightness. However, the differently sized changes in brightness may have roughly the same level of detectability by the user.

Accordingly, such nonlinear sensitivity of the human eye to changes in brightness may be suitably reflected in the EOTF, which may correspond to higher precision (e.g., lower compression) in dark regions at the left end of the graph, while allowing for lower precision (e.g., higher compression) in bright regions at the right end of the graph.

Oftentimes the calibration process may involve adjusting the shape of the EOTF and image quality may correspond to the shape and smoothness of the EOTF. If the shape of the EOTF curve is poorly approximated, quantization blockiness and other undesirable artifacts may be perceived by the user in images displayed by the display device. Accordingly, a well-defined EOTF lacking "bumps" or "kinks" may be suitable for quality display of images.

Furthermore, it can be challenging to mathematically compute the EOTF using a hardware-based integrated circuit. That is, although the analytical shape of the EOTF in hardware may be fairly simple, the low-cost, analytical calculation of the EOTF in an embedded circuit may be difficult. One solution is to store pre-computed functions as a look up table (LUT) in memory. Alternatively, the EOTF can be stored in an inverse LUT in logic.

Both approaches may be non-ideal for high dynamic range displays. The inverse LUT uses logic to store a plurality of tables needed to calculate the nonlinear value. Use of memory is impractical when many LUTs are needed. Storing the LUTs in logic does not permit them to be adjusted. The conventional LUT has been widely used for SDR imagery, but it does not scale well for high dynamic imagery. The size of the LUT can become too large to be practical.

Accordingly, modern video-processing systems deal with these types of nonlinear functions (e.g., EOTFs). Such video-processing systems receive nonlinearly encoded data representing the input image data, but may seek to perform various calculations or adjustments of the input image data (e.g., to adjust color, to sharpen contrast, to adjust brightness, etc.). Because it may be suitable to deal with such adjustments in the linear domain/linear space, as opposed to the nonlinear domain/nonlinear space in which the input image data lies, the system may seek to linearize the received nonlinear input image data so that the system may more easily perform various mathematical calculations on the data.

For example, in reproducing certain colors, such as a greenish-yellow, the ratio of red pixel values to green pixel values, which is used to reproduce such a color, may be a relevant factor in color reproduction. However, that particular ratio of pixel values may change dramatically depending on whether the image representation occurs in the linear domain or in the nonlinear domain. Because the linear domain corresponds to the user's perception, most changes or scaling of the ratio of pixel values, or color corrections, is done in the linear domain in a manner similar to the brightness adjustment described above (e.g., where smaller changes in relevant ratios of corresponding pixel values result in a more easily perceived change in color for certain shades and hues than others). However, such linear processing corresponds to higher precision (e.g., larger bit depth) than the nonlinear representation to maintain display of a quality image.

After linear processing is complete, the signal may be re-encoded into the nonlinear domain. In a display system, such nonlinear encoding is often referred to as gamma correction. However, nonlinear encoding may be difficult to perform with hardware-based processing, as high dynamic range (HDR) imaging makes nonlinear encoding more difficult.

The above information disclosed in this Background section is only to enhance the understanding of the background of the invention, and therefore it may contain information that does not constitute prior art.

SUMMARY

Embodiments of the present invention are directed to using an integrated circuit to perform nonlinear encoding of a linear image representation to produce a processed image.

According to one or more embodiments of the present invention, there is provided a method of image processing, the method including performing linear processing of an input data signal encoded with a nonlinear function to generate a linear representation of the input data signal including linearized image data, and using an integrated circuit to generate a processed nonlinear corrected image by piecewise quantization of/nonlinearly quantizing the linearized image data to generate nonlinear quantized data, generating a memory address based on the nonlinear quantized data, and accessing a lookup table based on the generated memory address.

The input data signal may include high dynamic range (HDR) data.

The method may further include performing signal processing on the linearized image data to adjust the linearized image data.

The nonlinear quantization of the linearized image data to generate nonlinear quantized data may include performing a nonlinear quantization function on the linearized image data, and performing a complimentary function that is complimentary to the nonlinear quantization function.

The nonlinear quantization of the linearized image data may include receiving an input value of the linearized image data, determining a data block encompassing the linearized image data in which the selected input value lies, determining a block bit shift corresponding to the determined data block, determining an offset corresponding to the determined data block, and calculating a memory address of the lookup table based on the determined data block, the determined block bit shift, and the determined offset.

The offset may correspond to memory addresses of the lookup table corresponding to input values of data blocks that are lower than the determined data block, and the method may further include correcting for out-of-range quantized values within the determined data block.

The method may further include assigning 2 to 10 data blocks including the determined data block.

The method may further include retrieving a single output value from the lookup table at the memory address for the selected input value.

The processed image may include the output value.

The method may further include determining a degree of error for each output value stored in the lookup table, and adjusting a quantization function corresponding to the nonlinear quantizing such any lookup table entry has an error of less than 1 least significant bit.

The method may further include determining boundary slice intervals using an optimization procedure to define the data blocks and bit shift levels.

The method may further include mapping the memory address to an output value stored in the lookup table, and retrieving the output value from the lookup table.

According to one or more embodiments of the present invention, there is provided a device for nonlinear encoding of linearized image data, the device including a compressive addressing computation processor for receiving an input vale of the linearized image data, a set of compression registers for performing a quantization function on the input value and for generating a memory address corresponding to the input value, a lookup table for storing an output value at the memory address, and a memory controller for accessing the lookup table to retrieve the output value.

The set of compression registers may include a boundary slice register for determining a boundary of a data block of the linearized image data corresponding to the input value, a block bit shift register for determining a block bit shift corresponding to the data block, and an offset register for determining an offset corresponding to the data block.

The device for nonlinear encoding of linearized image data may include an integrated circuit.

The integrated circuit may include only a single memory cell corresponding to the lookup table.

The single memory cell may be reprogrammable.

According to one or more embodiments of the present invention, there is provided a method of nonlinear data encoding, the method including generating a memory address based on a linear input value by determining a data block in which the linear input value lies, determining a block bit shift corresponding to the determined data block, determining an offset corresponding to the determined data block, and calculating a memory address of a lookup table based on the determined data block, the determined block bit shift, and the determined offset, and retrieving a nonlinear value from the lookup table based on the generated memory address.

The generating of the memory address and the retrieval of the nonlinear value may include using a single integrated circuit.

The retrieval of the nonlinear value from the lookup table based on the generated memory address may include delivering the generated memory address to a single memory controller on an integrated circuit, and retrieving the nonlinear value from a single memory cell comprising the lookup table using the memory controller.

BRIEF DESCRIPTION OF THE DRAWINGS

The accompanying drawings, together with the specification, illustrate exemplary embodiments of the present invention, and, together with the description, serve to explain features of the present invention, wherein.

DETAILED DESCRIPTION

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" may encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic devices or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Some portions of the following detailed descriptions are presented in terms of algorithms and/or symbolic representations of operations on data bits that may occur within a computer/server memory. These descriptions and representations are used by those skilled in the art of data compression to convey ideas, structures, and methodologies to others skilled in the art. An algorithm is a self-consistent sequence for achieving a desired result and requiring physical manipulations of physical quantities, which may take the form of electro-magnetic signals capable of being stored, transferred, combined, compared, replicated, reproduced, and otherwise manipulated. Such signals may be referred to as bits, values, elements, symbols, characters, terms, numbers, or the like. These and similar terms are associated with appropriate physical quantities, and are used as representative labels for these quantities. Accordingly, terms such as "processing," "computing," "calculating," "determining," "displaying" or the like, refer to the action and processes of a computing device or system that manipulates data represented as physical quantities within registers/memories into other data that is also represented by stored/transmitted/displayed physical quantities.

Embodiments of the present invention provide a method for performing nonlinear encoding of a high precision value to a lower precision value using an integrated circuit, and for using a memory addressing and LUT compression technique to reduce total memory used for nonlinear encoding. The integrated circuit used in the method includes only a single memory retrieval per value. Accordingly, the integrated circuit of embodiments of the present invention is highly implementable as part of an ASIC or FPGA design.

Figure 1:
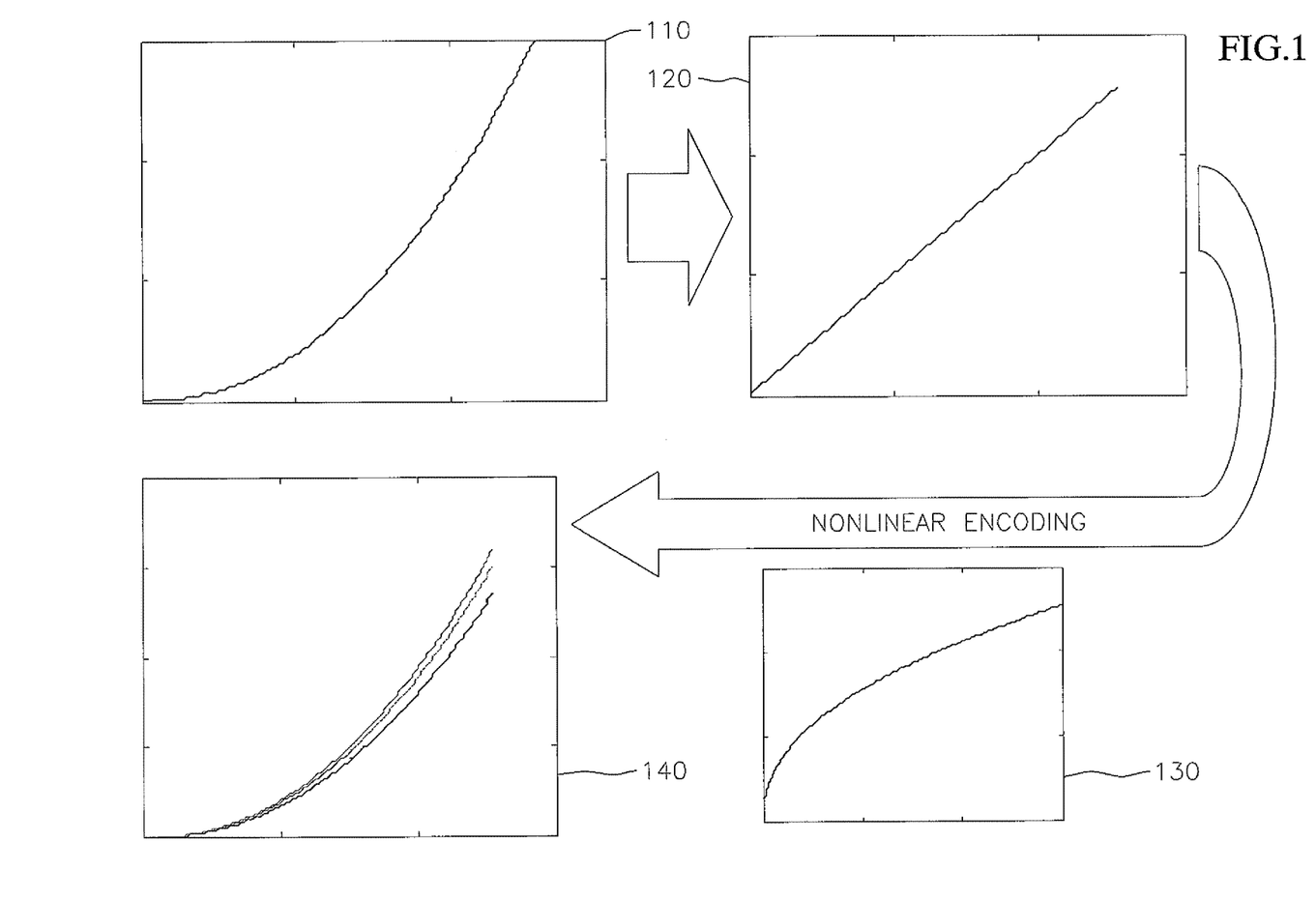
FIG. 1 illustrates processing of input image data according to an embodiment of the present invention.

FIG. 1 illustrates processing of input image data according to an embodiment of the present invention.

Referring to FIG. 1, a display system may linearize nonlinear input image data (e.g., a digital video signal encoded with a nonlinear function) 110 to produce linearized data/a linear image representation as a linearly processed digital signal/linear image representation/linearized image data 120. After the input image data is processed (e.g., to enable adjusting of color, contrast, brightness, etc.), the linearized image data 120 may be re-encoded (i.e., nonlinearly encoded) using a nonlinear function 130 to be shifted back into the nonlinear domain to generate a processed linear image 140. However, as mentioned before, nonlinear encoding of high precision data may be difficult to perform with hardware-based processing, because HDR images use higher bit depth for image processing, and because linear representation of data has to be of much higher working precision than nonlinear encoding (i.e., a large number of digital levels on the x-axis of the nonlinear function 130 maps to a relatively small number of values on the y-axis of the nonlinear function 130).

Accordingly, a circuit of the present embodiment (e.g., integrated circuit 200 of FIG. 2) could be used as part of a transcoding box that may change content from one type of HDR or SDR format to an alternate format. Such changes could involve a modification of the color primary encoding, EOTF function, or an adjustment for the peak content or display brightness. Depending on the incoming image format, complicated pre-processing may be required such that the image is transcoded into a format that is optimized for the imaging hardware within the device. Intermediate processing stages will likely require high precision processing, and a nonlinear quantization/piecewise quantization is often required to pass the image through a major interface.

The circuit may be of particular utility in systems that require flexibility in outputting different formats. The circuit may make use of as few as a single memory cell and a compact set of register values to encode high precision pixel data to a nonlinear function with much lower precision. The circuit could thus have applications in TV sets, set-top box systems, media players or mobile display systems.

For nonlinear encoding, the video-processing system may have to map a relatively large number of linearized digital values of the linearized image data 120 to a relatively small number of output data values/output values. That is, each possible input value of the input image data is assigned to a corresponding output value, with a total number of possible input values being greater than a total number of possible output values (e.g., input values at a left end of the linearized image data 120 may have little redundancy when mapped to the output values, while multiple adjacent input values at a right end of the linearized image data 120 may be mapped to a single output value). Without an analytical function to perform such nonlinear encoding, process constraints can be cumbersome. Furthermore, using a lookup table (LUT) to perform the nonlinear encoding may be impractical due to the size requirements.

For example, standard television and legacy devices, which may have 1000:1 contrast corresponding to 1000 levels, may use 8-bit nonlinear encoding, but may use 12 bits or more bits of working precision in linear calculations. However, HDR television, which may have up to 100,000:1 contrast, may use 10-bit or 12-bit nonlinear encoding, and may use more than 20 bits of working precision. That is, with HDR imaging, instead of trying to represent only 1000 levels, the range of represented levels may go from less than $1/100$th of a nit to over 1000 nits, thereby making an EOTF having higher nonlinearity and higher bit depths suitable.

Accordingly, conventional nonlinear encoding techniques might not scale efficiently for HDR TVs, and mapping from high precision to low precision may be impractical using existing methods. For example, using a full LUT for the increased data range corresponding to an HDR TV may be too large (e.g., the LUT may be on the order of a megabyte), such that the cost of memory may be too high, and such that an undesirable degree of redundancy may occur. As another example, an inverse LUT, despite being highly efficient in storage, may use an undesirably large number of memory blocks/memory cells. Also, because an inverse LUT provides an iterative approach that uses a decision tree to reach each output value, the inverse LUT may also use an undesirably large number of clock cycles to determine each output value. As an additional example, although linear interpolation or quadratic interpolation may be used instead of nonlinear encoding, linear and quadratic interpolation being approximations of analytical functions whereby certain key points may be stored for calculating intermediate values, significant artifact-casing errors may be generated for non-linear functions (e.g., color shifting may occur when approximating functions using a simple polynomial), and suitable nonlinear interpolation can be computationally expensive.

Accordingly, embodiments of the present invention provide a hierarchical LUT that is stored as a single, contiguous block of memory that uses only a single retrieval call to reduce redundancy and that provides a suitable technique for nonlinear encoding of high precision data.

Figure 2:
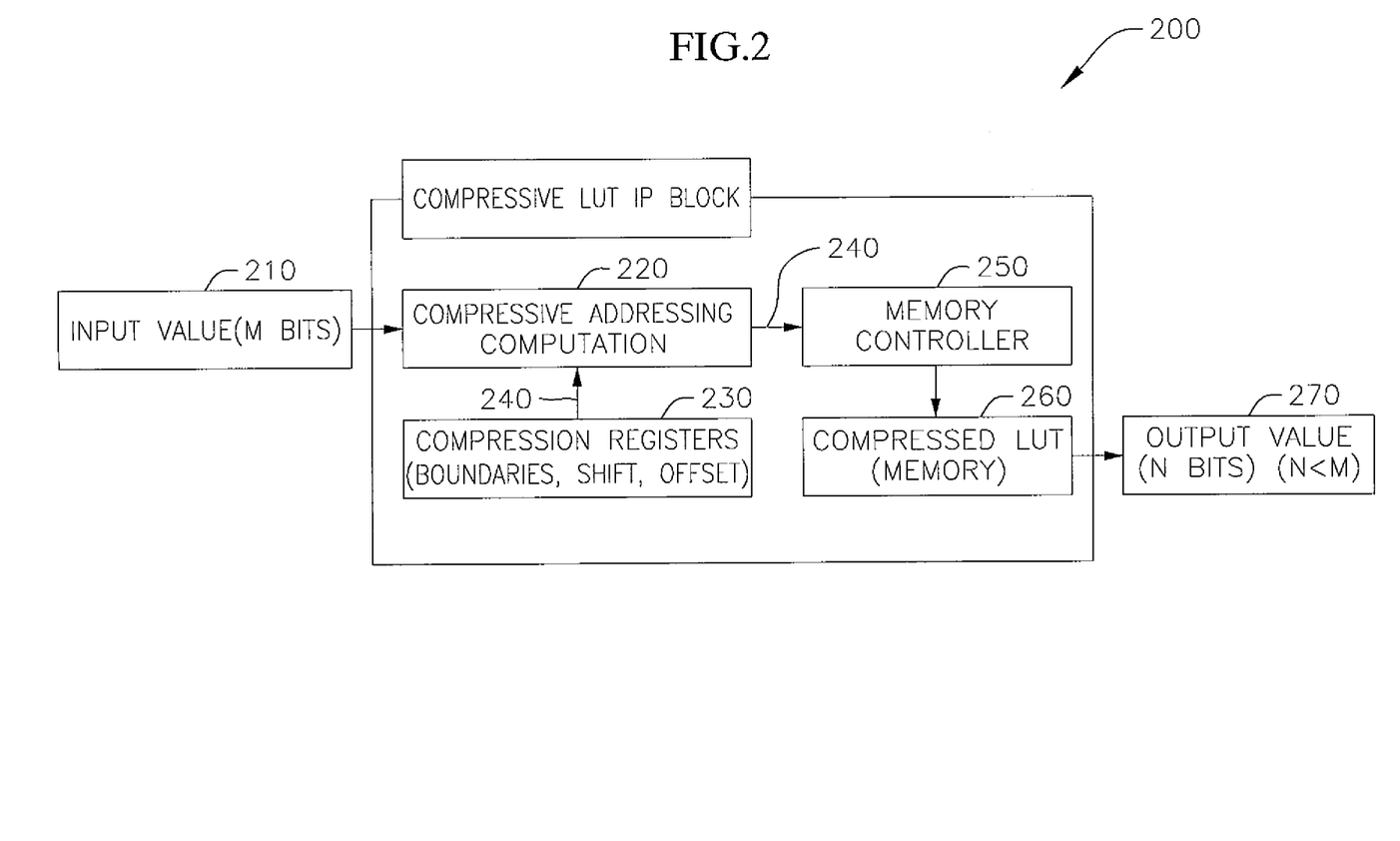
FIG. 2 is a block diagram of an integrated circuit according to an embodiment of the present invention.

FIG. 2 is a block diagram of an integrated circuit according to an embodiment of the present invention.

Referring to FIG. 2, the integrated circuit/compressive LUT IP block 200 is configured to receive an input value (e.g., an input pixel value) 210 of linearized image data (e.g., an input data signal, such as the linear image representation 120 of FIG. 1), and is configured to generate an output value 270 of nonlinear encoded processed image data (e.g., the processed linear image 140 of FIG. 1). The linearized image data 120 may have M possible bits, M being a positive integer, and the nonlinear encoded processed image data 140 may have N possible bits, N being a positive integer that is less than M. The input value 210 may correspond to an input image data value of the linear image representation/linearized image data 120 of FIG. 1.

A compressive addressing computation processor 220 of the integrated circuit 200 may receive the input value 210. The compressive addressing computation processor 220 then communicates with compression registers 230. As will be discussed in greater detail with reference to FIG. 3 below, the compression registers 230 collectively determine a memory address 240 corresponding to the input value 210 (e.g., a plurality of memory addresses 240 each corresponding to one or more possible input values 210). That is, the compression registers 230 allow the integrated circuit 200 to perform nonlinear quantization/piecewise quantization of the linearized image data 120 depending on the input value 210 to thereby generate nonlinear quantized data/a quantized version to thereby generate the memory address 240 based thereon.

The compression registers 230 deliver the memory address 240 to the compressive addressing computation processor 220. The compressive addressing computation processor 220 then delivers the memory address 240 corresponding to the input value 210 of the linearized image data 120 to a memory controller 250.

Upon receiving the memory address 240 based on the nonlinear quantization/piecewise quantization performed by the compression registers 230, the memory controller 250 accesses memory, which may be in the form of a compressed/nonlinear LUT 260 of a single memory cell/memory block. The LUT 260 retrieves the output value 270 of nonlinear encoded processed image data based on the memory address 240. The LUT 260 may then generate and output the output value 270. It should be noted that the LUT 260 is able to reduce, or compensate, output value errors that may arise from the nonlinear quantization performed by the compression registers 230.

Accordingly, as described above, the integrated circuit 200 is able to receive a linear input value 210, quantize the input value 210 differently depending on its value, and generate a memory address 240 based on the quantized version of the input value. Then the integrated circuit 200 is able to access the memory address 240 in the LUT 260 to determine an appropriate output value 270 corresponding to the input value 210.

Figure 3:
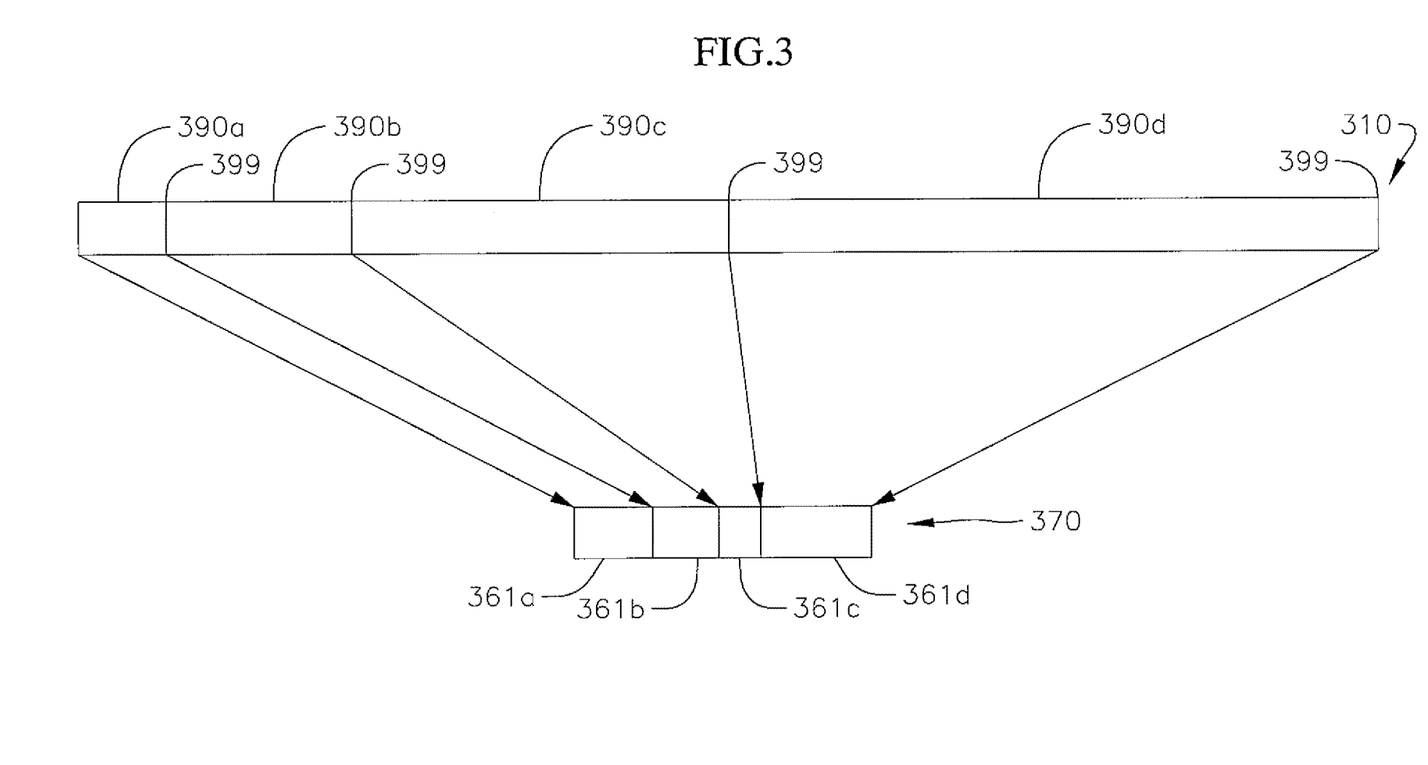
FIG. 3 is a pictorial representation depicting nonlinear quantization and conversion of input values to memory addresses for retrieval of values stored in a compact LUT according to an embodiment of the present invention.

FIG. 3 is a pictorial representation depicting nonlinear quantization/piecewise quantization and conversion of input values to memory addresses for retrieval of values stored in a compact LUT according to an embodiment of the present invention.

Referring to FIG. 3, input data includes input values 310 (e.g., the linearized image data 120 of FIG. 1 includes the input values 210 of FIG. 2). As described with respect to FIG. 2, the possible input values 310 may be quantized to generate output values 370 by using a nonlinear quantization function (e.g., the nonlinear function 130 of FIG. 1) and a compressed LUT (e.g., the LUT 260 of FIG. 2).

As can be seen in FIG. 3, the input values 310 of the linearized image data 120 may be divided into four data blocks 390a-390d. The data blocks 390 may be demarcated by boundary slices 399, which will be discussed further with reference to FIG. 4. Although four data blocks 390 are shown in the present embodiment, the input values 310 may be divided into as few as 2 data blocks 390, or may be divided into 10 data blocks 390 or more, in other embodiments of the present invention.

The input values 310 in each of the four data blocks 390 may be quantized differently depending on which of the data blocks 390 contains the input value 310. That is, as previously mentioned, the input values 310 may be quantized nonlinearly.

For example, as shown in FIG. 3 the input values 310 in a first data block 390a may have a one-to-one correspondence to output values 370 (which may correspond to the memory addresses 240 of FIG. 2) in a corresponding first LUT block/section 361a of the LUT (i.e., the number of input values 310 in the first data block 390a may be the same as the number of output values 370 in the first LUT block 361a), while the input values 310 in a second data block 390b of the input values 310 may be represented by a fewer number of output values 370 in a corresponding second LUT block 361b.

Furthermore, respective numbers of possible input values 310 of subsequent third and fourth data blocks 390c and 390d may correspond to fewer and fewer numbers of output values 370 respectively corresponding to third and fourth LUT blocks 361c and 361d. That is, a higher number of input values 310 at a right end of a range of input values 310 (e.g., input data values 310 in the fourth data block 390d) may be mapped to a single output value 370 than the number of input values 310 near a middle of the range of the input data (e.g., input data values 310 in the second or third data blocks 390b or 390c of the input values 310). The more aggressive quantization of the input values 310 of subsequent data blocks may correspond to perceptually relevant gray scale levels, as previously mentioned. In another example, the LUT blocks may have a uniform size. For example, as shown FIG. 3, the LUT blocks 361a-d each have a different size. The first LUT block 361a is larger than the second LUT block 361b, the third LUT block 361c is smaller than the second LUT block 361b, and the fourth LUT block 361d is the largest LUT block. The LUT blocks sizes may be chosen according to any factors relevant to mapping the input values 310 to the output values 370.

Figure 4:
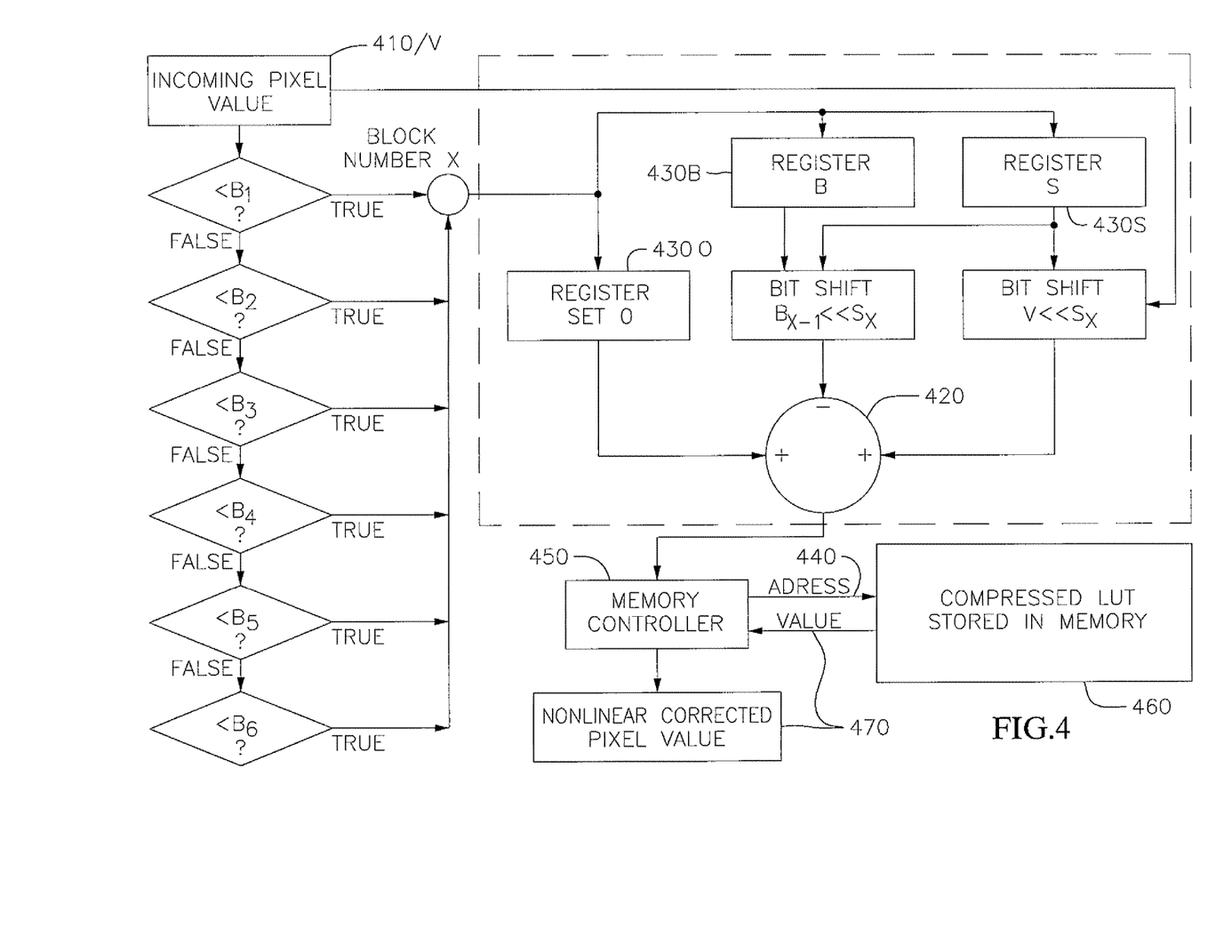
FIG. 4 is a block diagram depicting compressed addressing of input values according to an embodiment of the present invention.

FIG. 4 is a block diagram depicting compressed addressing of input values according to an embodiment of the present invention.

Each input value 410/V is classified into a data block and, depending on which data block the input value 410N is in, the input value 410/V is appropriately quantized by performing a combination of bit shifting and arithmetic operations. The quantized input value is then converted into a memory address that will map to an output value stored in the LUT 460.

Referring to FIG. 4, there are three sets of compression registers 430 that are stored for addressing a compressed/nonlinear LUT 460. The compression registers 430 may correspond to the compression registers 230 of the embodiment shown in FIG. 2, and the LUT 460 may correspond to the LUT 260 of the embodiment shown in FIG. 2.

The compression registers 430 of the present embodiment include a boundary slice register 430B (e.g., $B_1$, $B_2$, $B_3$ . . . ), a block bit shift register 430S (e.g., $S_1$, $S_2$, $S_3$ . . . ), and an offset register 430O ($O_1$, $O_2$, $O_3$ . . . ).

For compressed addressing of input values 410N, a process of the present embodiment may iteratively test if an input value 410N (e.g., input value 210 of FIG. 2 corresponding to input linearized image data 120 of FIG. 1) is less than each boundary slice, and may identify $B_X$ as the smallest boundary slice $B_1$ that is larger than the input value 410N. The boundary slices may correspond to the boundary slices 399 shown in FIG. 3, although the present embodiment shown in FIG. 4 corresponds to a greater number of data blocks than the embodiment shown in FIG. 3 (e.g., 6 data blocks instead of the 4 data blocks 390 shown in FIG. 3).

Once the process determines the data block 390 in which the input value 410N is located (e.g., BLOCK NUMBER X in FIG. 4), the boundary slice register 430B may determine a corresponding boundary slice (e.g., an upper boundary slice) $B_X$, the block bit shift register 430S (e.g., $S_1$, $S_2$, $S_3$ ... ) may determine a corresponding block bit shift $S_X$ (which corresponds to the quantization level of the input values 210 in the corresponding data block 390/BLOCK NUMBER X) and the offset register (e.g., $O_1$, $O_2$, $O_3$ ... ) 430O may determine a corresponding offset $O_X$.

Next, a process memory 420 (e.g., the compressive addressing computation processor 220 of FIG. 2) may calculate a memory address 440 (e.g., the memory address 240 of FIG. 2) corresponding to the input value 410N. The memory address 440 may be represented by the following equation:

$$O_X + \text{floor}(V/2^{(S_X)}) - B_{(X-1)}/2'(S_X)$$

Alternatively, if the offset Ox' is instead configured to include the offset above $O_X$, and to also include the floor (V/2^($S_X$)), the equation can be simplified to the following equation:

$$O_X' - B_{(X-1)}/2^{(S_X)}$$

It should be noted that, in other embodiments, the offset register 430O could be configured to include the block bit shift register 430S, and the arithmetic function (subtraction) occurring at 420 could be done during the calculation of the offset.

An example of determining a particular memory address 440 for a particular input value 410N is given below.

After the memory address is calculated, the process of the present embodiment may retrieve an output value 470 (e.g., the output value 270 of FIG. 2) from memory at the determined memory address 440 by accessing the LUT 460 stored in memory.

As discussed above with reference to FIG. 3, the degree of quantization performed on the input value 410N depends on the location of the input value 410N (e.g., depends on the quantization rate of data contained in the data block X in which the input value 410N located). That is, in the present embodiment, the larger the number of the smallest boundary slice $B_i$ that's larger than the input value 410/V, the greater the degree of quantization that will occur for the input values 410N located in the data block 390 defined by the boundary slice $B_i$. However, it should be noted that in other embodiments, the level of quantization of the input values 410N need not increase for each successive data block.

In the present example of the present embodiment, the input value/incoming pixel value 410N may be 70, the first boundary slice $B_1$ may be 64, and the second boundary slice $B_2$ may be 256. Accordingly, the first data block (e.g., data block 390a of FIG. 3) will contain the first 64 input values 410N (e.g., 0 to 63), and the second data block (e.g., data block 390b of FIG. 3) will contain the next 192 input values 410N (e.g., 64 to 255). Furthermore, in the present example, the bit shift $S_X$ for the first data block (e.g., $S_1$) will be 0, and the bit shift $S_X$ for the second data block (e.g., $S_2$) will be 2.

Accordingly, in the present example, the input values 410N included within the first data block have a one-to-one correspondence to 64 memory addresses 440 (i.e., no bit shift). That is, the first 64 input values 410N (e.g., values 0 to 63), which are included in the first data block, are not quantized, or are not compressed. Meanwhile the input values 410N included in the second data block are quantized (e.g., by using bit shifting corresponding to the block bit shift $S_X$ determined by the block bit shift register 430S (e.g., $S_1$, $S_2$, $S_3$ ... )). The input values 410N in the second data block are quantized to correspond to only 48 memory addresses 440. That is, the input values 410N in the second data block, the second data block being defined by the first and second boundary slices $B_1$ and $B_2$, may be divided by 4 (i.e., bit shifted by 2) to achieve quantized values of 16-64 (e.g., floor(V/$S_X$)). The division/quantization of the input values 410N may also be described as the bit shift $S_X$. In the present example, the bit shift $S_2$ is 2 (i.e., division by 4) for the second data block.

For the present example, the input value 410N of 70 is determined to be not less than first boundary slice $B_1$ of 64 (i.e., V<$B_1$ is false), but is determined to be less than second boundary slice $B_2$ of 256 (i.e., V<$B_2$ is true). Accordingly, the BLOCK NUMBER X (i.e., the block defined by boundary slices $B_1$ and $B_2$) is determined to correspond to a second data block (i.e., X is 2).

Because the bit shift $S_2$ for the input values 410N in the second data block is 2, the bit shift of the input value 410N of 70 is calculated to be 17 (i.e., 70 is 01000110 in binary, and 01000110 bit shifted by 2 is 00010001, which corresponds to 17 in decimal/base 10). That is, to obtain the quantized value, the input value of 70 is divided by 4 and rounded down (floor(V/$S_2$)).

Because the first 64 input values 410N, which are included in the first data block, correspond to the first 64 memory addresses 440, the offset register 430O determines the second offset $O_2$ to be 65 (i.e., a number that is one after the total number of previously assigned memory addresses 440 (e.g., the number memory addresses in the first LUT block of the LUT 460), the total number in the present example corresponding to the first 64 memory addresses 440). It should be noted that the first offset $O_1$ corresponding to the first data block in the present example is 0.

Accordingly, in the second operation, the memory address 440 calculated by the equation $O_X + \text{floor}(V/S_X) - B_{(X-1)}/S_X$ is determined to be 65+floor(70/4)-(64/4) (i.e., $O_2$+floor(V/$S_2$)-$B_1$/$S_2$), which is equal to 65+17-16. Accordingly, in the present example, the input value 410/V of 70 corresponds to the memory address of 66.

Then, in the third operation, the process may retrieve a corresponding output value 470 (e.g., a nonlinear corrected pixel value, which may correspond to the output values 270 and 370 of FIGS. 2 and 3) from the nonlinear/compressed LUT 460 that is stored in memory at the determined memory address 440 of 66. This may be performed by a memory controller 450 (e.g., the memory controller 250 of FIG. 2). Then, for example, the memory controller 450 may output the determined output value 470 as a nonlinear corrected pixel value.

In an embodiment of the present invention, the boundary slices $B_i$ may each be a power of 2 (e.g. 64, 512, 8192, 32768, 131072), the boundaries of each LUT block may be stored as an offset, and for each data block 390, there may be a bit shift $S_X$ to use with truncation (e.g. a bit shift of 0 for the first data block, a bit shift of 2 for the second data block, a bit shift of 4 for the third data block, a bit shift of 6 for the fourth data block, and a bit shift of 7 for the fifth data block). That is, in the present embodiment, the first 64 input values 0 to 63 would have a standard full precision LUT (e.g., first LUT block 361a), the input values 410N of the second data block (i.e., 64, 68, 72 ... , 504, 508) are quantized with 2 bit shift, and the input values 410N of the third block (i.e., 512, 528, 544, . . . 8174, 8190) are quantized with 4 bit shift. For each value, a LUT value corresponds to the output mapping.

It should be noted that the above is just an example. For example, in other embodiments, evenly spaced logarithmic boundary sizes and bit shifts may be used, thereby enabling the calculation of the offsets based on the boundaries and bit shifts used. Additionally, the boundary slices, bit shifts, and offsets, the boundary slice intervals may be determined by an optimization procedure. Within each boundary slice, the total error of the output should be below an acceptable error tolerance. If, upon calculation, the error is determined to be larger than the tolerance, the error can be reduced by decreasing the block bit shift, thereby resulting in an increase in memory size. The error can alternatively be reduced in a given data block n by modification of the boundary slice of the previous data block n−1, thereby effectively lowering the block bit shift for a subset of the values that were previously in block n. Additionally, the offsets may be calculated based on the total LUT storage of blocks 1:(n−1).

As described above, embodiments of the present invention generally provide a process for mapping a high bit depth value to a non-linear low bit depth value while using only a single memory cell and a single memory retrieval, wherein simple calculations are used as part of addressing computation.

As a theoretical example, exact output values may be determined by the following nonlinear equation:

$$\text{Output}_{exact} = F_{nonlin}(\text{Input}),$$

wherein the input includes a high precision set of integer values, while the output includes a lower precision nonlinear set of integer values.

Furthermore, approximate output values may be determined by the following equation:

$$\text{Output}_{approx} = F_2(F_1(\text{Input})),$$

wherein the following equation is true:

$$d/dx\ \text{Output}_{exact}(x) </= d/dx\ F_1(\text{Input}_x),$$

thereby indicating that the derivative of the output (e.g., the processed linear image 140 of FIG. 1) is less than the derivative of the input (e.g., the linearized image data 120 of FIG. 1).

Furthermore, $$F_2(F_1(x)) </= \text{Output}_{exact}(x) + E_Q, \text{ and}$$

$$F_2(F_1(x)) >/= \text{Output}_{exact}(x) - E_Q,$$

wherein $E_Q$ is a quantization error (e.g., 1 LSB).

With respect to the embodiments of the present invention described above, the function $F_2(x)$ is effectively a LUT (e.g., the LUT 260, 460 of FIGS. 2-4) that maps the function $F_1(x)$ (e.g., the nonlinear quantization for nonlinearly encoding the input values 210, 310, 410N of FIGS. 2-4) to an output value (e.g., output value 270, 370, 470 of FIGS. 2-4) with tolerance for quantization error $E_Q$.

That is, embodiments of the present invention allow for the generation of an approximated output by using two functions, $F_1$ and $F_2$. The first function $F_1$ is a nonlinear/piecewise quantization function that removes a number of LSBs from the input values (e.g., input values 210 of the linearized image data 120 corresponding to the input image data 110), and offsets these to form a memory address (e.g., memory address 240). That is, the function $F_1$ is a quantization function to compress data (e.g., the linearized image data 120 of FIG. 1) into fewer bits. The second function $F_2$ is a complimentary function of $F_1$ that maps the generated memory address to an appropriate output value (e.g., a lookup table function to map memory addresses 240 to the output values 270). Both functions $F_1$ and $F_2$ are discrete, non-analytical, nonlinear functions that are tightly related.

Depending on which data block contains the input image data (e.g., which data block of data blocks 390 contains the input image data 310), the quantization/compression achieved by the use of function $F_1$ may be either more aggressive or less aggressive than the quantization/compression achieved at other positions (e.g., for data 310 of other data blocks 390). For example, in the linear domain, each LSB of data may represent a measurable quanta, such as 0.1 nit, wherein a user may be able to perceive every change in the LSB (i.e., every change of 0.1 nits) at the dark end of the linear domain, while the user may only recognize a change for every 1 nits increase at the bright end of the linear domain, thereby making as many as 3 or 4 least significant bits in the brighter data block unneeded for quality visual representation of the input image data.

The function $F_1$ may be a relatively complicated function that is preprogrammed such that an output of the function $F_1$ is set and stored in the display system. This may be done by comparing, for example, input digital values to output coded values. If it is noticed that two or more discrete input values correspond to no change in output (y-axis) for a change in input digital/pixel values (x-axis), then more aggressive quantization/compression may be performed for that block of input values, thereby leading to reduced redundancy for pixel values within this block, while other block will preserve their assigned precision. By using the function $F_1$, the pixel values are quantized to generate a corresponding, and fairly compact, address that is used to address the LUT (function $F_2$), which stores the correct output values. That is, each step on the output approximately reflects a change on the input.

The function $F_2$, which compliments the function $F_1$, may be tuned to have a small footprint. However, increasing the bit depth of the input data does not necessarily require more hierarchy levels of the LUT or an increase in the LUT size. Rather the $F_2$ function and the corresponding $F_1$ quantization functions are based largely on bitdepth of the output. Accordingly, the compressed LUT can be adjusted to represent large output precision or small output precision.

Accordingly, the process of embodiments of the present invention provide a highly scalable solution for high precision input signals, having as many as 24 bits of precision (or more), for example, while offering a fairly compact way to scale down according to desired output precision, and may be on the same order as the output precision.

Furthermore, the single memory cell can be reprogrammed according to differently desired output characteristics. Further still, the set of registers is fairly compact, and could be updated over time if a change in function is sought. Additionally, embodiments of the present invention can be applied to concatenated functions (e.g., sRGB, which consists of linear and nonlinear regions), pure power functions such as 2.2 gamma and can also be applied to the PQ function (e.g., SMPTE S-2084).

In some embodiments, the register set and LUT may be reprogrammed using an over-the-internet update for formats that are not yet popularized.

Moreover, the only mathematical operations used to perform the above described embodiments are bit shift truncation, addition, and subtraction. Furthermore, redundancy is reduced such that the total memory used for an N-bit output and an I-bit input is of order N, all memory is stored as a contiguous array, memory is accessed only once, and a single algorithm addresses a correct element from a compact LUT/memory array based on the input value.

Further still, in other embodiments, the memory for storing the LUT can be reduced even further by performing additional compression techniques, such as by reducing the size of the LUT by using linear interpolation. That is, if the calculation of the memory address 240, 440 had higher precision than the LUT 260, 460, or if the resolution of the LUT 260, 460 was reduced, there may be accessible values located between LUT entries, and the integrated circuit 200 could use an interpolation algorithm to interpolate the interstitial values within the LUT 260, 460. As another example, the LUT 260, 460 of the previously described embodiments may have around 2000 members corresponding to around 300,000 input values. However, redundancy of the LUT function (e.g., function $F_2$) may be largely monotonic, or only slightly nonlinear. Accordingly, instead of storing an entire arbitrary LUT in memory, additional compression may be achieved by encoding the LUT as a difference from a liner mapping, thereby allowing for the additional truncation of one or more bits of information (e.g., a reduction of the most significant bits from 10 bits to 7 or 8 bits). However, such additional compression may come at the expense of additional logic.

In yet further embodiments, temporal dithering or spatial dithering may be additionally performed. That is, the visibility of quantization artifacts may be reduced when the output bit depth is greater than the bit depth of the display system. Accordingly, after determining a final output value (e.g., output values 270, 370, 470), dithering may be performed to allow for a reduction in the bits of information (e.g., a reduction from 10 bits to 8 bits).

Figure 5:
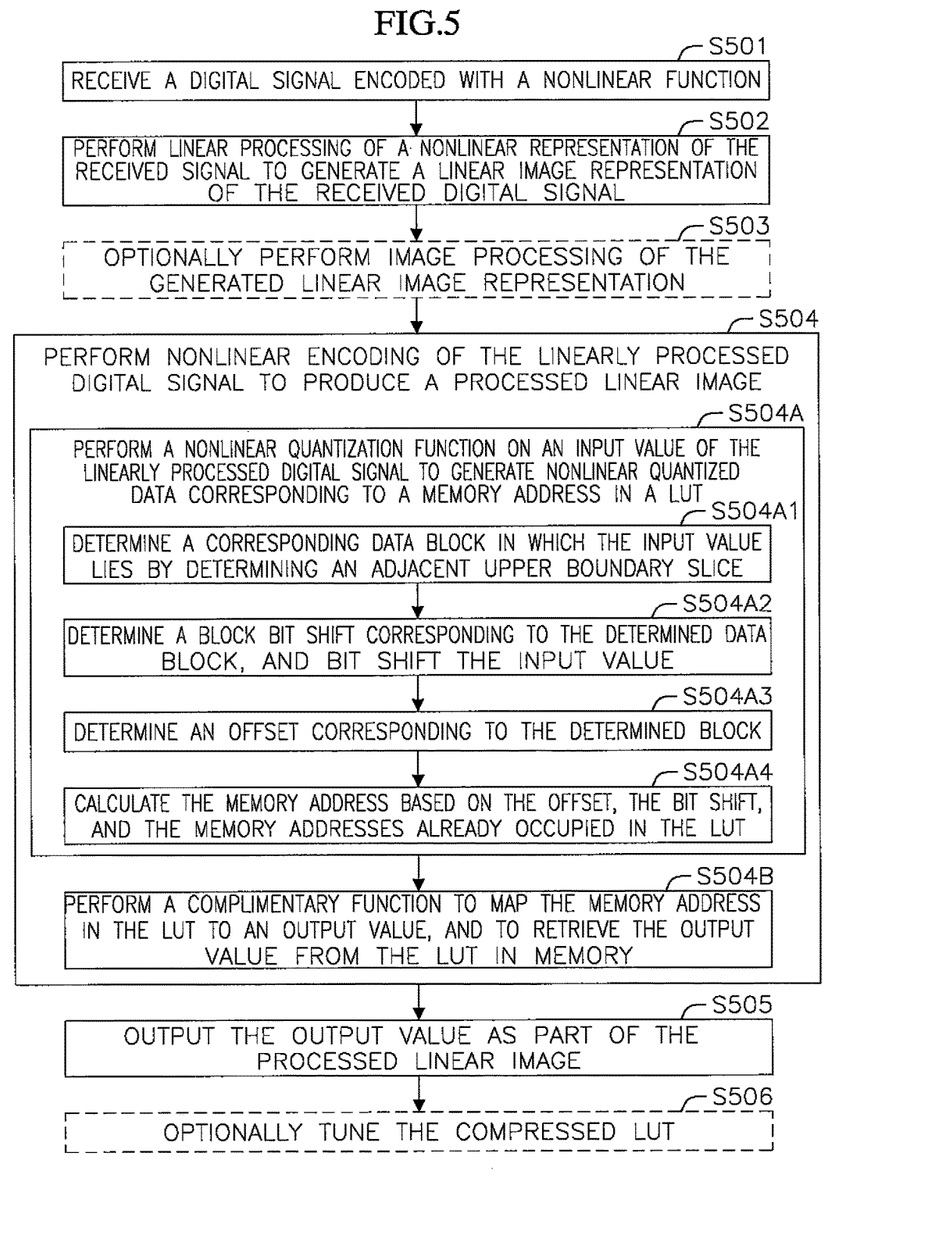
FIG. 5 is a flow chart illustrating a process for nonlinear encoding a linear image representation to generate a processed linear image, according to an embodiment of the present invention.

FIG. 5 is a flow chart illustrating a process for nonlinear encoding linearized image data to generate a processed linear image, according to an embodiment of the present invention.

Referring to FIG. 5, at operation S501, a digital signal encoded with a nonlinear function is received (e.g., nonlinear input image data 110 of FIG. 1 may be received by a display device as a digital image signal).

At operation S502, linear processing of a nonlinear representation of the received digital signal to generate linearized data/a linear image representation of the received digital signal may be performed (e.g., a video processor of the display device may linearize the received nonlinear input image data 110 to generate the linearized image data 120 as the processed signal of FIG. 1). Furthermore, at operation s503, adjustments, or image signal processing, of the generated linearized image data may be optionally performed (e.g., the video processor may adjust the linearized image data 120 to manipulate aspects of the visual representation of the data, such as color, contrast, brightness, etc., to adjust the images perceived by a user).

At operation S504 nonlinear encoding of the linearized image data may be performed to produce a processed linear image (e.g., the integrated circuit 200 of FIG. 2 may be used to perform nonlinear encoding (using the nonlinear function 130) of the linearized image data 120 to produce the processed linear image 140).

For example, the nonlinear encoding may include, at operation S504A, performing a nonlinear/piecewise quantization function on an input value of the linearized image data to generate nonlinear quantized data corresponding to a memory address in a LUT (e.g., the integrated circuit 200 of FIG. 2 may be used to perform the nonlinear quantization function $F_1$ on the input value 210, 310, 410/V of the linearized image data 120 to generate quantized data corresponding to a memory address 240, 440).

In further detail, performing the nonlinear quantization function on the input value of the linearized image data to generate the nonlinear quantized data corresponding to a memory address in the LUT may include one or more operations. For example, at operation S504A1, performing the piecewise quantization function may include determining a corresponding data block in which the input value lies by determining an adjacent upper boundary slice (e.g., by using the boundary slice register 430B of FIG. 4 to determine an adjacent upper boundary slice $B_1$ of a corresponding data block 390/BLOCK NUMBER X). Performing the piecewise quantization function may further include, at operation S504 A2, determining a block bit shift corresponding to the determined data block, to bit shift the input value (e.g., using block bit shift register 430S of FIG. 4 to determine bit shift $S_X$, and bit shifting the input value 210, 310, 410/V). Performing the nonlinear quantization function may yet further include, at operation S504A3, determining an offset corresponding to the determined data block (e.g., using the offset register 430O to determine offset Ox, which may be equal to the lower boundary of a corresponding LUT block 361). Performing the nonlinear quantization function may also include, at operation S504A4, calculating the memory address based on the offset, the bit shift, and the memory addresses already occupied in the LUT (e.g., calculating, with the compressive addressing computation processor 220 of FIG. 2 or process memory 420 of FIG. 4, the memory address 240, 440s based on the equation $O_X+\text{floor}(V/S_X)-B_{(x-1)}/S_X$ or optionally a similar equation incorporating the $B_{(x-1)}/S_X$ offset in $O_X$.

Furthermore, for example, the nonlinear encoding may further include, at operation S504B, performing a complimentary function to map the memory address in the LUT to an output value, and to retrieve the output value from the LUT in memory. Referring back to FIG. 2, the integrated circuit 200 of FIG. 2 may be used to perform the nonlinear/lookup table function $F_2$ on the quantized data to map the memory address 240, 440 in the LUT 260, 460 to the output value 270, 370, 470, and may retrieve the output value 270, 370, 470 using the memory controller 250, 450.

At operation S505, the output value may be outputted as part of the processed linear image (e.g., the memory controller 250/450 may output the retrieved output value 270/470 as a nonlinear corrected pixel value corresponding to the processed linear image 140).

At operation S506, the compressed LUT may be optionally tuned (e.g., the nonlinear/lookup table function $F_2$ may be adjusted if the error is determined to be greater than a predetermined error threshold (e.g., greater than 1 LSB of the processed linear image 140 as the output signal)).

Accordingly, the above described embodiments of the present invention are able to provide an integrated circuit that is able to perform nonlinear encoding of linearized image data using hardware-based processing.

While this disclosure has been described in connection with what is presently considered to be practical exemplary embodiments of the present invention, it is to be understood that the present invention is not limited to the disclosed embodiments, but, on the contrary, is intended to cover various suitable modifications and equivalent arrangements included within the spirit and scope of the appended claims and their equivalents.

What is claimed is:

1. A method of image processing, the method comprising:
performing linear processing of an input data signal encoded with a nonlinear function to generate a linear representation of the input data signal comprising linearized image data;
performing hardware-based processing of data by using an integrated circuit to generate a processed nonlinear image by:
nonlinearly quantizing the linearized image data to generate nonlinear quantized data by mapping a larger number of linearized digital values of the linearized image data to a smaller number of data values corresponding to the nonlinear quantized data, wherein the nonlinearly quantizing the linearized image data comprises:
receiving an input value of the linearized image data;
determining a data block encompassing the linearized image data in which the selected input value lies;
determining an offset corresponding to the determined data block;
determining a block bit shift corresponding to the determined data block;
bit-shifting the input value according to the block bit shift to generate most significant bits;
bit-shifting a boundary slice of an immediately prior data block according to the block bit shift to generate a prior boundary slice offset; and
generating the nonlinear quantized data by summing the most significant bits with the offset and subtracting the prior boundary slice offset;
generating a memory address based on the nonlinear quantized data; and
accessing a lookup table based on the generated memory address, such that a memory overhead associated with the processing of the data by using the mapping is lower than when not using the mapping; and
performing signal processing on the linearized image data to adjust the linearized image data.

2. The method of claim 1, wherein the input data signal comprises high dynamic range (HDR) data.

3. The method of claim 1, wherein the nonlinearly quantizing the linearized image data to generate nonlinear quantized data comprises:
performing a nonlinear quantization function on the linearized image data; and
performing a complimentary function that is complimentary to the nonlinear quantization function.

4. The method of claim 1, wherein the offset corresponds to memory addresses of the lookup table corresponding to input values of data blocks that are lower than the determined data block; and
wherein the method further comprises correcting for out-of-range quantized values within the determined data block.

5. The method of claim 1, further comprising assigning 2 to 10 data blocks comprising the determined data block.

6. The method of claim 1, further comprising retrieving a single output value from the lookup table at the memory address for the selected input value.

7. The method of claim 6, wherein the processed nonlinear image comprises the output value.

8. The method of claim 6, further comprising:
determining a degree of error for each output value stored in the lookup table; and
adjusting a quantization function corresponding to the nonlinear quantizing such that any look up table entry has an error of less than 1 least significant bit.

9. The method of claim 8, further comprising determining boundary slice intervals using an optimization procedure to define the data blocks and bit shift levels.

10. The method of claim 1, further comprising:
mapping the memory address to an output value stored in the lookup table; and
retrieving the output value from the lookup table.

11. A device for nonlinear encoding of linearized image data, the device comprising:
a compressive addressing computation processor for receiving an input value of the linearized image data, for performing a quantization function on the input value, and for performing signal processing on the linearized image data to adjust the linearized image data;
a set of compression registers for delivering, to the compressive addressing computation processor, a memory address corresponding to the input value, wherein the set of compression registers comprise:
a boundary slice register for storing a boundary of a data block of the linearized image data corresponding to the input value;
a block bit shift register for storing a block bit shift corresponding to the data block; and
an offset register for storing an offset corresponding to the data block;
a lookup table for storing an output value at the memory address; and
a memory controller for accessing the lookup table to retrieve the output value,
wherein performing a quantization function on the input value comprises:
determining a data block encompassing the linearized image data in which the selected input value lies;
determining, by the offset register, an offset corresponding to the determined data block;
determining a block bit shift, by the block bit shift register, corresponding to the determined data block;
bit-shifting the input value according to the block bit shift to generate most significant bits;
bit-shifting the boundary of the data bock according to the block bit shift to generate a prior boundary slice offset; and
generating the memory address according to the sum of the most significant bits and the offset minus the prior boundary slice offset.

12. The device of claim 11, wherein the device for nonlinear encoding of linearized image data comprises an integrated circuit.

13. The device of claim 12, wherein the integrated circuit comprises only a single memory cell corresponding to the lookup table.

14. The device of claim 13, wherein the single memory cell is reprogrammable.

15. A method of nonlinear data encoding for performing signal processing on linearized image data to adjust the linearized image data, the method comprising:
generating a memory address based on a linear input value by:
determining a data block in which the linear input value lies;
determining a block bit shift corresponding to the determined data block;

determining an offset corresponding to the determined data block; and bit-shifting the linear input value according to the block bit shift to generate most significant bits;

bit-shifting a boundary slice of an immediately prior data block according to the block bit shift to generate a prior boundary slice offset;

calculating a memory address of a lookup table, wherein the memory address is equal to the sum of the most significant bits and the offset minus the prior boundary slice offset; and retrieving a nonlinear value from the lookup table based on the generated memory address.

16. The method of claim 15, wherein the generating the memory address and the retrieve the nonlinear value comprises using a single integrated circuit.

17. The method of claim 15, wherein the retrieving the nonlinear value from the lookup table based on the generated memory address comprises:

delivering the generated memory address to a single memory controller on an integrated circuit, and retrieving the nonlinear value from a single memory cell comprising the lookup table using the memory controller.

* * * * *